United States Patent
Prafullchandra et al.

(10) Patent No.: US 9,781,165 B1
(45) Date of Patent: *Oct. 3, 2017

(54) METHODS FOR ASSURING SECURITY GOVERNANCE IN MANAGED COMPUTER SYSTEMS

(71) Applicant: HyTrust, Inc., Mountain View, CA (US)

(72) Inventors: Hemma Prafullchandra, Mountain View, CA (US); Govindarajan Rangarajan, Sunnyvale, CA (US)

(73) Assignee: HyTrust, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,481

(22) Filed: Jul. 5, 2017

Related U.S. Application Data

(63) Continuation of application No. 15/400,227, filed on Jan. 6, 2017, now Pat. No. 9,736,188, which is a continuation of application No. 15/264,887, filed on Sep. 14, 2016, now Pat. No. 9,578,066.

(51) Int. Cl.
*H04L 29/06* (2006.01)

(52) U.S. Cl.
CPC .......... *H04L 63/20* (2013.01); *H04L 63/1433* (2013.01); *H04L 63/205* (2013.01)

(58) Field of Classification Search
CPC ..................................................... H04L 63/20
See application file for complete search history.

(56) References Cited

U.S. PATENT DOCUMENTS

| | | | | |
|---|---|---|---|---|
| 6,070,244 A | * | 5/2000 | Orchier | G06F 21/6218 709/223 |
| 6,460,141 B1 | * | 10/2002 | Olden | G06F 21/604 726/12 |
| 7,308,702 B1 | * | 12/2007 | Thomsen | G06F 21/604 707/999.009 |
| 8,065,714 B2 | | 11/2011 | Budko et al. | |

(Continued)

OTHER PUBLICATIONS

Rockart et al.; The management of end user computing; Published in: Magazine Communications of the ACM CACM Homepage archive; vol. 26 Issue 10, Oct. 1983; pp. 776-784; ACM Digital Library.*

(Continued)

*Primary Examiner* — Bradley Holder
(74) *Attorney, Agent, or Firm* — Ascenda Law Group, PC

(57) ABSTRACT

An agile governance system provides recommendations for infrastructure change requests concerning a cloud-based computer environment in accordance with security policies regarding data to be used in connection with applications impacted by the requests. The nature and character of the data is determined using an interactive dialog with a requesting entity. Possible responses provided by the requesting entity are mapped to security policy requirements, which, in turn, are used to determine infrastructure stack requirements. Where pre-approved solutions that satisfy the security needs for the requested infrastructure change exist, they are recommended; otherwise, the requesting entity is presented with the recommendation for the requested infrastructure change along with a list of required approvals and approvers.

17 Claims, 6 Drawing Sheets

(56) References Cited

U.S. PATENT DOCUMENTS

| | | | |
|---|---|---|---|
| 8,166,552 B2 | 4/2012 | Prafullchandra et al. | |
| 8,336,079 B2 | 12/2012 | Budko et al. | |
| 8,539,589 B2 | 9/2013 | Prafullchandra et al. | |
| 8,832,784 B2 | 9/2014 | Budko et al. | |
| 8,966,578 B1 | 2/2015 | Belov et al. | |
| 9,389,606 B2* | 7/2016 | Govindaraj | G05B 19/054 |
| 9,460,286 B1* | 10/2016 | Felstaine | H04L 63/1441 |
| 2002/0078381 A1* | 6/2002 | Farley | G06F 21/552 726/23 |
| 2003/0065942 A1* | 4/2003 | Lineman | G06F 21/577 726/4 |
| 2006/0136720 A1* | 6/2006 | Armstrong | G06F 21/53 713/164 |
| 2006/0218651 A1* | 9/2006 | Ginter | G06Q 40/12 726/27 |
| 2007/0226256 A1* | 9/2007 | Imai | H04L 63/0823 |
| 2008/0066151 A1* | 3/2008 | Thomsen | G06F 21/604 726/1 |
| 2008/0178255 A1* | 7/2008 | Gaikovich | G06F 21/6218 726/1 |
| 2011/0125894 A1* | 5/2011 | Anderson | H04L 9/3213 709/224 |
| 2012/0036561 A1 | 2/2012 | Budko et al. | |
| 2013/0123946 A1* | 5/2013 | Govindaraj | G05B 19/054 700/19 |
| 2014/0075494 A1* | 3/2014 | Fadida | G06F 9/45558 726/1 |
| 2014/0310513 A1* | 10/2014 | Barney | H04L 63/0428 713/153 |
| 2015/0381641 A1* | 12/2015 | Cabrera | H04L 63/1425 726/23 |
| 2016/0044013 A1 | 2/2016 | Belov et al. | |
| 2016/0164895 A1* | 6/2016 | Satish | H04L 63/20 726/1 |
| 2016/0191467 A1 | 6/2016 | Budku et al. | |

OTHER PUBLICATIONS

Ramgovind et al.; The management of security in Cloud computing; Published in: Information Security for South Africa (ISSA), 2010; Date of Conference: Aug. 2-4, 2010; IEEE Xplore.*

Prafullchandra; et al., "Harmonized Governance System for Heterogeneous Agile Information Technology Environments", U.S. Appl. No. 15/018,478, filed Feb. 8, 2016, 35 pages.

Prafullchandra; et al., "Harmonized Governance System for Heterogeneous Agile Information Technology Environments", U.S. Appl. No. 15/211,947, filed Jul. 15, 2016, 35 pages.

Ramgovind; et al., "The management of security in Cloud computing", Published in: Information Security for South Africa (ISSA), 2010; Date of Conference: Aug. 2-4, 2010; IEEE Xplore, 7 pages.

Rockart: et al., "The management of end user computing", Published in: Magazine Communications of the ACM CACM Homepage archive; vol. 26 Issue 10, Oct. 1983; pp. 776-784; ACM Digital Library.

* cited by examiner

METHODS FOR ASSURING SECURITY GOVERNANCE IN MANAGED COMPUTER SYSTEMS

RELATED APPLICATIONS

This is a CONTINUATION of U.S. application Ser. No. 15/400,227, filed Jan. 6, 2007, which is a CONTINUATION of U.S. application Ser. No. 15/264,887, filed Sep. 14, 2016, now U.S. Pat. No. 9,578,066, each of which is incorporated herein by reference.

FIELD OF THE INVENTION

The present invention is directed to automated systems and methods for assuring security governance in connection with infrastructure change requests concerning managed computer systems.

BACKGROUND

Virtualized computer systems, cloud systems (e.g., private, hybrid, and/or public cloud systems), and other computer-based systems (e.g., network and storage system) defined, with resources provisioned and released, and managed (dynamically) by software (collectively, "managed computer systems") need to be properly secured. Proper security is, in this regard, typically defined by a set of policies, some of which may be demanded by government and industry regulations and others of which may be necessitated by an enterprise's customers' expectations or business requirements. Often, the policies will be dictated by the nature and character of the data being operated upon by processes and applications instantiated within the managed computer systems.

SUMMARY

An agile governance system (AGS) configured in accordance with embodiments of the present invention facilitates the automated provisioning and, optionally, provisioning, of recommendations for infrastructure stacks in response to infrastructure change requests for an agile information technology environment such as a cloud-based computer environment. In one example, a request for an infrastructure change results in the presentation of a series of interrogatories in the form of individual questions having associated multiple-choice possible responses. The interrogatories are adapted to determine, according to the possible responses thereto, both the nature and character of data intended to be collected and/or operated upon by an application running in the agile information technology environment in which the requested infrastructure change will be instantiated, and the nature and character of that environment. The requested infrastructure change is generally to be provisioned and configured according to security requirements demanded by one or more security policies for the data that will be collected and/or operated upon.

The questions and associated multiple choice possible responses are presented dynamically, such that each successive question and its associated possible responses are determined according to one or more of:
  (i) characteristics and nature of the application(s) to be run and/or the data to be used thereby;
  (ii) responses to previous ones of the questions posed by the interrogatories;
  (iii) a risk profile for the requested infrastructure change,
  (iv) an agility profile for the requested infrastructure change,
  (v) deployment policies for components implicated by the infrastructure change; and
  (vi) the availability of pre-approved solutions (e.g., templates) for provisioning of the infrastructure change in agile environments available to host the application(s); and
  (vii) time at which the requested infrastructure change will be provisioned.

In accordance with the responses provided to the interrogatories, the AGS determines whether one or more pre-approved solutions which meet the security requirements for the requested infrastructure change exist and, if so, generates a recommendation specifying the pre-approved solution(s) for the requested infrastructure change. Each such pre-approved solution specifies deployment instantiation requirements for components that will satisfy the requested infrastructure change. If no pre-approved solution for the requested infrastructure change exists, the agile governance system generates a recommendation for a solution that will satisfy the requested infrastructure change while meeting the associated security requirements. That recommendation specifies both the deployment instantiation requirements for components to satisfy the requested infrastructure change and a list of approvals and, optionally, approvers, required in connection with provisioning the recommended solution. In each case, the requesting entity is presented with the recommendation, i.e., the pre-approved solution(s) if any exist, or, if not, the recommendation along with the list of required approvals/approvers required.

These and other features of the present invention are explained in greater detail below.

BRIEF DESCRIPTION OF THE DRAWINGS

The present invention is illustrated by way of example in the figures of the accompanying drawings, in which.

DETAILED DESCRIPTION

Figure 1:
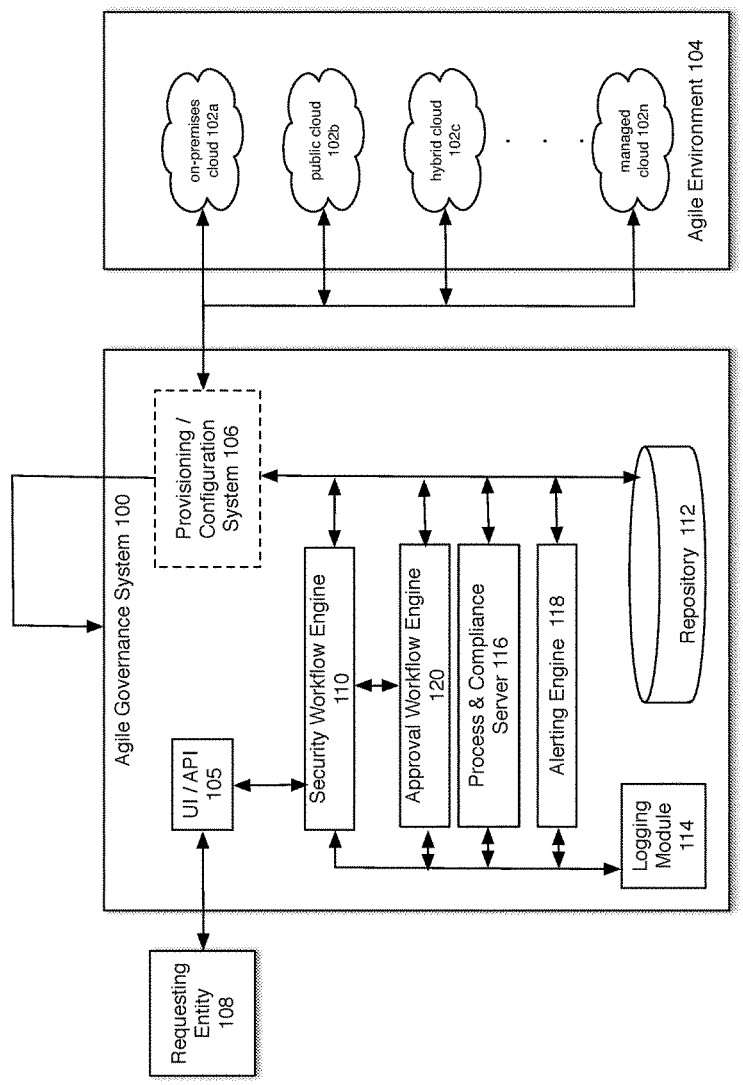
FIG. 1 depicts an example of an agile governance system configured in accordance with some embodiments of the invention.

Many organizations make use of "cloud-based" computing infrastructures in which applications are run on virtualized systems instantiated on private, hybrid, and/or public cloud servers. While such infrastructures can provide many advantages for an enterprise, it remains the case that enterprises making use of such infrastructures must still comply with a variety of business and government requirements concerning security, privacy and critical infrastructure. For example, regulations (both governmental and enterprise in nature) and industry best practice guidelines concerning various kinds of data processed within cloud-based computing infrastructures demand that steps be taken to assure the security of both the data and the systems on which it is created, processed, and stored.

The present inventors have recognized that because optimized use of cloud-based computing infrastructures (or, more generally, "agile information technology environments") imply multi-tenancy and frequent movement of workloads (e.g., virtual machines, containers, etc.) among different physical hosts, there is a need for a technology that can assure such workloads are always deployed on a compliant infrastructure. In this regard, "compliant" means that the infrastructure includes required security controls (as dictated by, among other things, the nature and character of the data to be operated upon), and "infrastructure" includes, but is not limited to, hardware, hypervisor(s), and virtual images (which collectively may be regarded as a "stack"), along with network storage and applications. Compliance must be provided whilst retaining the agility gains afforded by cloud-based provisioning. Complicating these requirements is the fact that the physical hosts may be distributed among different cloud environments and perhaps managed by different entities; hence, the movement of workloads between clouds requires the same level of controls, assurance, and flexibility.

To address these needs, the present invention provides a security- and data-defined methodology for agile information technology environments that translates business purpose, data classification, and system information into viable controls that can be used to provide continuous governance, consistency across environments via equivalence mapping, monitoring, and multi-tenant segmentation based on aggregate risk. This methodology, and the system which implements it, uses a data-centric workflow for controlling system/workload deployment on virtual/cloud infrastructures. By doing so, the present invention helps reduce approval timeframes for workload provisioning by using data and security workflows to automatically assess risk, and assign and enforce regulatory controls that apply to infrastructure stacks and workloads in private, public, and hybrid clouds. Further, the present invention automatically creates logical segmentations of a virtual infrastructure to address use cases of multi-tenancy that can include: segmentation by data and asset classification, segmentation by business purpose, and segmentation by geo-location; and place workloads appropriately.

In one embodiment, the above outcomes are achieved by an agile governance process that includes several constituents. First, infrastructure change requests (or, more generally, service requests) are described and classified. Second, the requests are processed by a risk-scoring algorithm that suggests security policies based on parameters such as data usage and/or type, deployment stage, and business purpose. Third, based on the suggested security policies, recommendations for instantiations of the requested changes are developed and presented. Where available, pre-approved solutions for the requested changes are used so as to speed fulfillment of the change request.

This latter point is worth emphasizing. In some cases, recommended solution(s) for a service request may comport with pre-approved, agile information technology environment solutions, and so can (optionally) be delivered to automated provisioning systems for rapid deployment. That is, an existing solution (e.g., a "stack" as defined above) will exist that meets the requirements of a recommended solution for the service request. In such cases, once the recommended solution has been accepted by the requesting entity, the request can be fulfilled according to the pre-approved solution.

In other cases, the recommendation may provide for use of an existing agile information technology environment but also require an exception to a pre-approved solution for deployment in that environment. By way of example, the recommended solution for a service request may permit the use of an existing public cloud infrastructure available to the requesting entity, but only if an exception for use of one server type in place of another is permitted. In such instances, the recommendation may include the list of approvals and, optionally, associated approvers required before the request can be provisioned. Such exception approvals may be for one-time use only, or may be (or may become) saved as new pre-approved solutions for later requests.

Alternatively, the recommendations may provide for use of an existing agile information technology environment but also require custom provisioning to meet necessary security controls. Or, recommendations may require complete custom development, installation, and provisioning of a solution (including the environment in which it is deployed). In such instances (as with the case of an exception noted above) where pre-approved solutions are not available or appropriate, or require modification for a given service request, a series of approvers with authority in areas such as security, privacy, compliance, information technology, and finance are identified to approve or reject the proposed solution to the request. Once those consents have been obtained, the system provisions the required (and now approved) infrastructure in one or more target cloud environments in accordance with the assessed requirements for security and performance, and coordinates the implementation of security and compliance controls that apply to the administrators and users of the instantiated infrastructure. As indicated above, once the modified or customized solutions have gone through this kind of approval process, those solutions may be templated and added to a library of pre-approved solutions for future use. The time to provision a solution may itself be a criterion for evaluation in connection with a recommendation and/or acceptance of the recommendation.

The management and coordination of the above-described processes may be achieved through the use of supporting subsystems; for example: a security workflow engine, an approvals engine, a process and compliance validation and reporting server, and a real-time alerting engine. The security workflow engine utilizes a risk-scoring algorithm to predictively select both security policies attendant to a given service request and, where needed, workflow approvers for recommended solutions for same. Where such approvals are needed, the approvals workflow engine determines that process. The process and compliance validation and reporting server provides visibility into workflow processes to allow requesters and managers to identify and manage work items that impact agility. The alerting system provides notifications to stakeholders to ensure that agility targets are met for various projects.

Referring now to FIG. 1, an example of an agile governance system (AGS) 100 configured in accordance with an embodiment of the present invention is illustrated. AGS 100 produces recommendations for instantiating solutions to service requests in one or more cloud-based computing infrastructures 102*a*-102*n* that make up agile environment 104. Each cloud-based computing infrastructure 102a-102n is itself an agile information technology environment that is characterized by instantaneous and dynamic changes made by multiple users with service requests. Provisioning of such solutions to service requests may be facilitated by a provisioning/configuration system 106 (which may, in some instances, be a component of AGS 100 or may, in other instances, be a separate provisioning system) in an automated manner, for example where the recommendations produced by AGS 100 comport with pre-approved agile information technology environment solutions, or approvals to modifications of such pre-approved solutions have been obtained. In this context, the service requests may be invoked by human users, or by scripts or applications running on associated computer systems. We refer to such users and automated processes collectively in the illustration as "requesting entities" 108. Although not shown, it should be recognized that service requests from requesting entities 108 may be first intercepted by or subject to approval from an access control system in order to verify credentials and/or access rights of the requesting entity before they are assessed and/or acted upon by AGS 100.

Provisioning system 106 may, in some instances, be configured to configure the AGS 100 itself. For example, where changes to the AGS are needed in order to implement software updates, etc. Also, the provisioning system may include a validation/compliance checker to facilitate monitoring and assessment of the agile information technology environment 104 to ensure that the various cloud infrastructures that make up the environment continue to meet the needs of pre-approved solutions (e.g., those solutions undergo revision to reflect changes in security requirements). Such assessments may be carried out on as-needed or periodic bases. Deviations from such requirements may be cause for alerts to system administrators, and may remove the environments from recommendations until they are remediated to again meet the needs of the pre-approved solutions.

Figure 2:
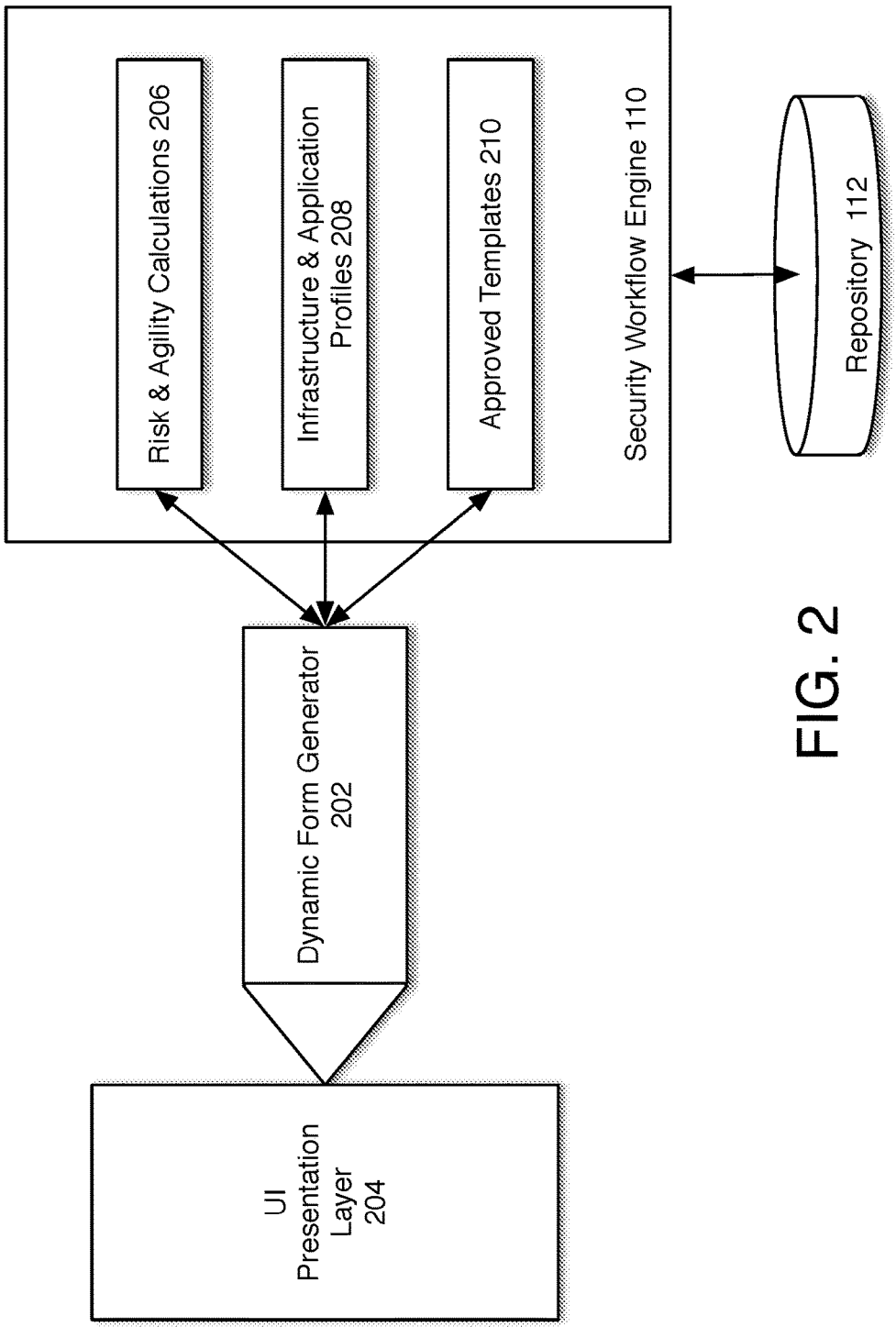
FIG. 2 illustrates in a conceptual fashion the presentation of dynamically generated forms used during a question and answer dialog between the agile governance system of FIG. 1 and a requesting entity, in accordance with embodiments of the present invention.

In one embodiment of the invention, when a service request by a requesting entity 108 is presented to AGS 100, the AGS engages the requesting entity in a dialog in order to identify security policies and requirements implicated by the request. As illustrated in FIGS. 1 and 2, the dialog is presented, via a user interface (UI) 105 (which in some instances may be or may include an application programming interface (API), e.g., where machine-to-machine communications are involved), as a series of interrogatories in the form of individual questions and associated multiple choice possible responses. Each question and its associated possible responses, from which the requesting entity is expect to choose, are constructed by a dynamic form generator 202 and issued to the requesting entity for response through a presentation layer 204 of the user interface. In the case of a human requesting entity, the presentation may be through the display of one or more web pages or a similar form of interface that allows for human-computer interaction. In the case of a machine-based requesting entity, the presentation may be by passing messages though an appropriate application programming interface, command line interface, or similar means. In other cases, discussed further below, rather than an interrogatory-based dialog, a service level specification may be used as a basis for determining necessary security requirements associated with a service request.

The interrogatories presented by the form generator 202 are adapted according to risk and agility calculations 206, infrastructure and application profiles 208, and approved infrastructure templates 210, to determine, according to the requesting entity's provided responses, (a) the nature and character of data intended to be collected and/or operated upon by an application running in an environment in which the requested infrastructure change will be instantiated, and (b) the nature and character of that environment. For example, one question may seek to determine the purpose for or to which the service request pertains. Possible responses to the question (presented in multiple choice format for selection by the requesting entity) may include prototyping/research, offering alternative instantiations in a live environment, and replacing an existing instantiation in a live environment. Some or all of the provided possible responses may have sub-parts that include the kind of data to be processed, for example, no consumer data, sanitized consumer data, or live consumer data. Another question may seek to determine the duration of the change implicated by the service request. Possible responses (again, presented in multiple choice format for selection by the requesting entity) may include temporary time periods, e.g., "less than one month," "one to three months," "three to six months," extended time periods, etc., e.g., "less than one year," "less than two years," etc., or indeterminate time periods such as "until changed," "forever," "unknown," etc. Of course, these are only examples of the kinds of questions that may be posed and their respective possible responses.

Using pre-established questions and associated possible responses, as described above, ensures that service requests are assessed in a uniform manner, so that solutions will be provisioned and configured according to security requirements demanded for the data by one or more security policies. The questions and associated multiple choice responses are presented to the requesting entity dynamically, such that each successive question and its associated possible responses are determined by the security workflow engine 110 according to one or more of: possible responses to previous one(s) of the questions, a risk profile for the service request, an agility profile for the service request, deployment policies for components implicated by the service request, available approved templates for provisioning of the service request in agile environments available to host the application(s) to which it pertains, and a time at which the requested infrastructure change will be provisioned. For example, if a response to a question seeking to determine the purpose for or to which a service request pertains indicates that the request is concerned with a prototype deployment in which no live consumer data will be used, this allows for a solution using an "any cloud" environment because there is a minimal risk of compromising sensitive data. The recommended solution may be further refined (e.g., to specify a least expensive option) if successive responses to questions indicate that the prototype is to be left instantiated indefinitely. On the other hand, if the responses to the questions indicate that an application is to make use of live consumer data for any amount of time, then only cloud-based infrastructures meeting security policies that assure both physical and logical security of specified natures or degrees may be appropriate and only solutions compliant with such policies recommended for deployment.

In order to provide a recommended solution for the service request, the security workflow engine 110 determines whether, based on the responses to the questions presented to the requesting entity, a pre-approved solution for the deployment implicated by the service request exists. For example, security workflow engine 110 may consult repository 112 (e.g., using a table lookup or other reference) to determine whether any pre-approved solutions satisfy the requested infrastructure change. If a pre-approved solution is available, the security workflow engine generates a recommendation that incorporates the pre-approved solution (a "pre-approved recommendation") for the service request. The pre-approved recommendation will specify deployment instantiation requirements for the service request, and, if an automated provisioning system is available, the pre-approved recommendation may be passed to the provisioning system for deployment of the associated infrastructure in one or more clouds of agile environment 104. Otherwise, the pre-approved recommendation may be provided to the requesting entity 108 for further handling.

If the security workflow engine 110 determines, based on the possible responses to the questions presented to the requesting entity, that no pre-approved solution for the deployment implicated by the service request exists, security workflow engine 110 generates a recommendation for a solution that satisfies the service request (while meeting appropriate security requirements). The recommendation will specify deployment instantiation requirements for the service request and include a list of approvers required to agree to the recommended solution. The list of approvers may be obtained by reference to repository 112 (e.g., by table lookup or other reference in order to obtain information concerning approvers that are required for infrastructure changes impacted by the service request). The approvers are generally individuals within an enterprise that have been designated for overseeing aspects of agile environment service requests that impact their areas of responsibility. For example, approvals may be required for one or more of: financial terms associated with a requested deployment, technical considerations implicated by the requested deployment (e.g., both in terms of technical staff and equipment), risk management concerns associated with a requested deployment, etc. The requesting entity is provided the recommendation for the solution to the service request along with the list of approvers required to authorize it. When (and if) the approvals have been obtained (a process which may be monitored by the approvals workflow engine 120), the security workflow engine may authorize the requested deployment using the automated provisioning system 106, if it is available, and/or simply log the authorization in logging module 114. As a matter of record keeping, logging module 114 is appraised of all activities by AGS 100 (including the questions presented to a requesting entity, responses received thereto, recommendations made, security regulations and policies consulted and/or reviewed in connection with the making of the recommendations, approvals received or not received, and provisioning instructions issued, etc.). Such logs assist in later audits and in revising the operations of the security workflow engine.

Above it was noted that rather than an interrogatory-based dialog, a service level specification may be used as a basis for determining security requirements associated with a service request. For example, a user may issue a service request to create a LAMP stack in a designated cloud through the associated cloud provider's administration portal. LAMP is an archetypal model of web service solution stacks, named as an acronym of the names of its original four open-source components: the Linux operating system, the Apache HTTP Server, the MySQL relational database management system (RDBMS), and the PHP programming language, and is used here as an example solely for convenience. Associated with the request may be a specified service level (e.g., "bronze," "silver," or "gold"), or the customer may have an existing service agreement with a specified service level.

The request (and specified service level, if applicable) may be received at the cloud provider's orchestration system, which acts as the requesting entity as defined above. As the requesting entity, the cloud provider's orchestration system will translate the single user request for the LAMP stack into multiple service requests for the various constituent components of that stack. Rather than engage in the interrogatory process discussed above, however, these service requests are made in accordance with the specified service level associated with the original user request. Different service levels may implicate different requirements for data encryption, encryption key management, trust attestation, compliance assessment, data sovereignty, logging, etc. Further, the service requests are presented programmatically, via appropriate APIs, to AGS 100.

As discussed above, the service requests presented by the cloud provider's orchestration system are evaluated by AGS 100 to determine whether pre-approved solutions exist, and, if so, those solutions are presented (e.g., as one or more JSONs) in response to the request. Pre-approved solutions so presented may be used by the cloud provider's provisioning systems to instantiate the solutions in the designated cloud environment. Where pre-approved solutions are not available, or where exceptions or modifications of such solutions are needed, the approvals workflow engine 120 may be invoked to provide the list of approvals and approvers needed for the requests. In this case, rather than pass such a list to the user, the alerting engine 118 may be invoked to alert the various approvers to the need to examine and approve or reject the proposed deviations from pre-approved solutions.

Figure 3:
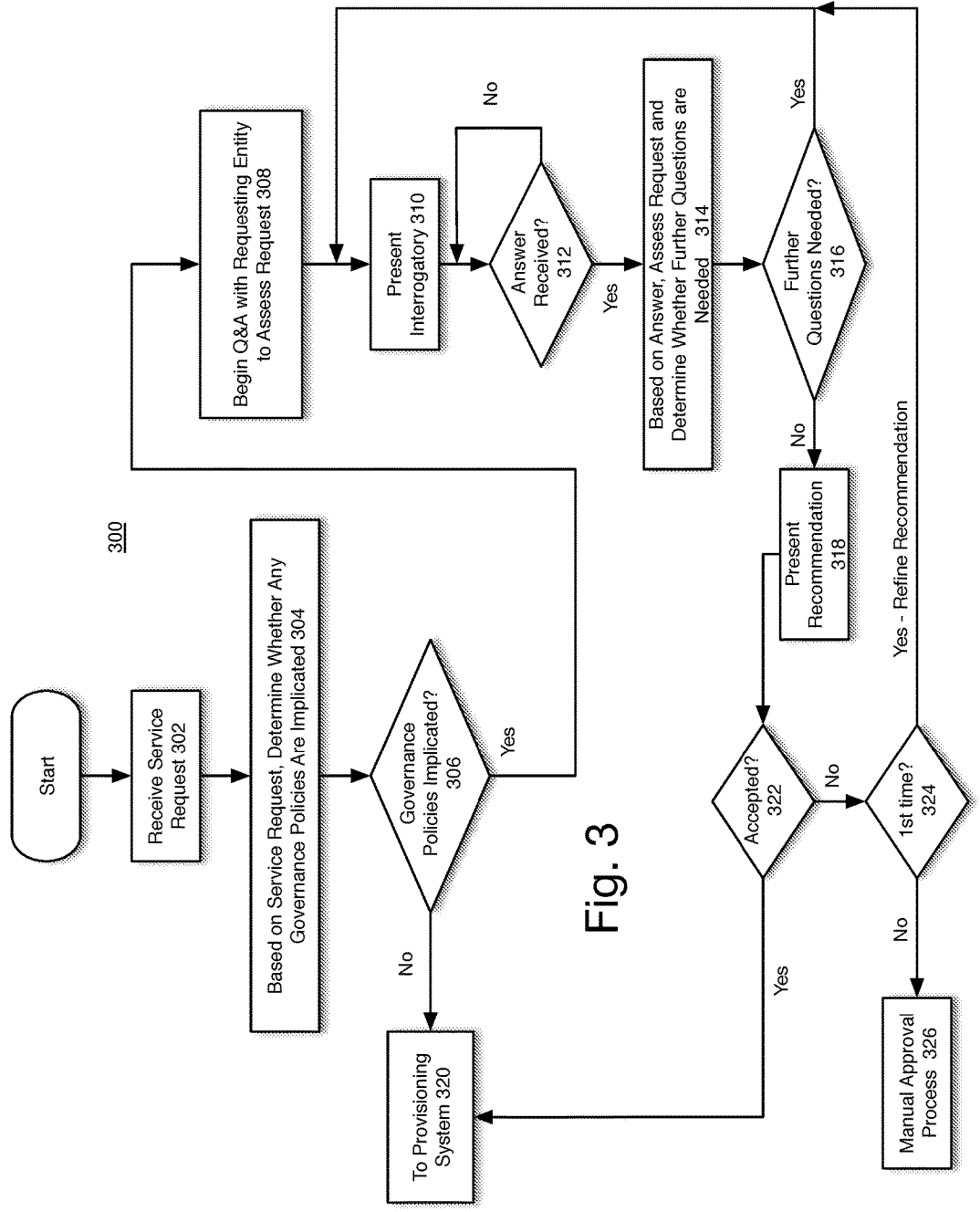
FIG. 3 illustrates an example of a process for providing recommendations for solutions to infrastructure change requests in accordance with embodiments of the present invention.

Referring now to FIG. 3, an example of a process 300 for providing recommendations in response to a service request in accordance with the present invention is illustrated. Upon receipt of a service request 302, the security workflow engine 110 determines whether any governance policies are implicated by the request 304. If no governance policies are so implicated, step 306, the service request is able to proceed to be provisioned 320. Otherwise, further actions are undertaken to assess the request, as described below.

In one embodiment, in order to determine whether or not the service request implicates any governance policies, the security workflow engine consults a mapping stored in repository 112. The mapping may be a table or other data structure organized so as to relate service requests to enterprise, industry, and/or regulatory mandates concerning security criteria. One such mapping is the cloud controls matrix published by the Cloud Security Alliance. In order to assist in making such a determination, a requesting entity may be required to select from a list of predetermined categories of requests at the time the service request is presented. Such a selection will classify the service request, allowing for a rapid assessment using the stored mapping. Note that this assessment of whether or not the service request implicates any governance policies is intended to be a gross classification process and not a fine-grained assessment as provided for by the interactive question and answer evaluation discussed below. It is intended only to segregate those, likely limited, service requests that involve no governance policies whatsoever from those that do implicate such polices so that rapid authorization of same may be provided where appropriate.

If the determination at step 306 indicates that one or more governance policies are implicated by the service request, then the question and answer evaluation process begins 308. As indicated above, the question and answer process involves one or more interrogatories being presented 310 to the requesting entity to determine, according to the requesting entity's responses thereto, (a) the nature and character of data intended to be collected and/or operated upon by an application running in an environment in which the requested infrastructure change will be instantiated, and (b) the nature and character of that environment. As each interrogatory is presented 310, the security workflow engine waits for the requesting entity to answer 312, and then, based on the answer, assesses the request to determine whether further questions are needed before providing a recommendation 314. If further questions are needed 316, a next question is presented. This continues until no further possible responses to questions are needed 316 and a recommendation is presented 318. Alternatively, where programmatic communications are involved, service level requests may arrive with specified service level requirements that map to pre-defined security-based requirements.

If one or more of the recommended solution(s) are acceptable to the requesting entity 322, the requesting entity may accept the service request and the request may proceed to the provisioning system 320. If the recommended solution(s) is(are) not acceptable, then the process of producing and providing a recommendation may be repeated. In the illustrated example, only one additional iteration of the process is provided for, however, in other embodiments more than one such additional iteration may be appropriate. For the illustrated process 300, if the first presented recommendation(s) is(are) not acceptable 324, the question and answer procedure beginning at step 310 is repeated. If this second pass results in an acceptable recommendation 322, the requesting entity may accept the service request. However, if no acceptable recommendation results from this second attempt 324, a manual approval process 326 (e.g., one that evaluates the security requirements and associated compliant solutions) must be used. Note that in the case where the requesting entity is another computer system, a second pass to obtain a revised recommendation may not be appropriate. In such instances, an exception report (or alert) and reversion to a manual approval process may be needed. As indicated above, the time to provision a solution may itself be a criterion for evaluation in connection with a recommendation and/or acceptance of the recommendation.

Figure 4:
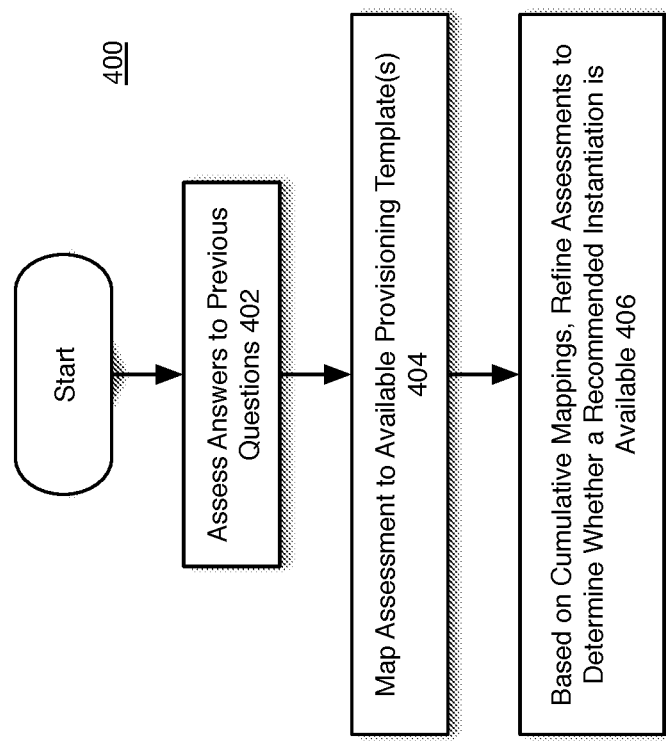
FIG. 4 provides additional details concerning the process illustrated in FIG. 3.

FIG. 4 illustrates in greater detail an example of a process 400 (illustrated as step 314 in FIG. 3) by which the security workflow engine may determine whether further responses to questions are needed before providing a recommendation. As each answer to a question is received, the cumulative responses received to that point are assessed 402 and mapped to available provisioning templates 404. Assessment 402 may involve examining risk profiles, an expected life of the asset in question, agility calculations, examinations of the environment and its ability to support elasticity (i.e., assessing whether the environment can support the change being requested), etc.

Based on the cumulative mappings provided by the template(s), the assessment of the possible responses from the requesting entity are refined in order to determine whether a recommendation can be made 406. For example, the recommendations that are indicated based on responses to one or more questions may be subsumed with or may preclude selection of recommendations that are indicated by other possible responses. For instance, recommendations of "any cloud" would be precluded by recommendations that demanded an on-premises cloud. Recommendations of "any cloud" would not, however, be precluded by those that indicated a preference for a "lowest cost cloud" as a low cost cloud-based solution could be had in any of a public cloud, a private cloud, or a hybrid cloud. Thus, in refining the assessments of the possible responses from the requesting entity, incompatible recommendations are resolved to require those demanding stricter security controls (e.g., as specified by implicated governance policies) over those that allow more permissive implementations. Further, the refining is not limited to considerations of only security policies and may include multiple dimensions such as cost and other factors.

More generally, through the question and answer process (or according to the specified service level) the service request is evaluated according to security requirements demanded by and for the data that will be processed by the infrastructure stack associated with the request. By understanding the nature and kind of the data to be used in connection with the service request (as revealed through the possible responses provided by the requesting entity to the questions presented by the security workflow engine), the relevant security policies can be determined. Again, this may be accomplished through the use of mappings of security policies and regulations to data types, categories, kinds, natures, etc. The security policies then drive the provision of a recommendation.

The recommendation provided at step 318 may be a pre-approved recommendation for the service request, if one is available. In this context, pre-approved recommendations specify deployment instantiation requirements for service requests that have already been considered and approved by an enterprise (e.g., an architecture review board of an enterprise) as conforming to applicable security and other policies for a given set of circumstances (e.g., data type/nature, cost, length of deployment time, intended users, etc.). Otherwise, the recommendation for the service request may specify requirements for the service request that do not conform to a pre-approved recommendation. For example, the recommendation may include unique security requirements or unique firewall settings, etc. In such instances, the recommendation will also include a list of approvers required to approve the service request. The list of approvers may be obtained by the security workflow engine from repository 112.

In some circumstances a requesting entity may reject a recommendation provided by the security workflow engine. For example, if a recommendation necessitates additional approvals because it did not conform to a pre-approved recommendation, the requesting entity may reject it and initiate a new request, this time answering the questions posed by security workflow engine differently having considered the impact of the original possible responses that were provided. Alternatively, the requesting entity may seek approval for an original service request outside of the approvals provided as part of a recommendation. In such instances, however, the requesting entity could not make use of automated provisioning that may be provided once recommended approvals have been obtained and, presumably, would need to explain the reasons for departing from the approvals list accompanying the original recommendation. As indicated above, all such actions as involve the AGS 100 are logged by logging module 114, hence, the departures from such approvals would be recorded.

The security workflow engine 110 may also be invoked when seeking to modify a recommendation based on changed circumstances. For example, earlier recommendations can be recalled from repository 112 and the possible responses provided to questions that formed part of the service request history of the recommendation modified to reflect the changed circumstances. For instance, a deployment originally intended as a prototype to work on sanitized consumer data may now be intended as a commercial application that will use live consumer data. By altering the possible responses to questions that relate to such topics, the security workflow engine may be called upon to generate a new recommendation, or to generate a modified recommendation with the differences between the original recommendation and the new recommendation highlighted for ease of reference. As before, if the new/modified recommendation conforms to a pre-authorized recommendation, it may be passed to the automated provisioning system 106 for instantiation, otherwise, if no pre-authorized recommendation is available the new/modified recommendation together with the list of approvers required for same will be provided.

Returning to FIG. 1, AGS 100 also includes a process and compliance validation and reporting server 116. Server 116 is responsible for monitoring workflow processes utilizing AGS 100 and providing reports on the utilization of specific cloud environments. For example, reports that itemize asset utilizations (as identified in recommendations) may be produced so that business owners may better understand which assets are being used by workloads in the business. Further, the reports may describe service requests by category, thus affording visibility into how workloads are being moved and, subsequently, allocated within the enterprise. One report of interest may include times taken to fulfill service requests and/or the number of requests that required manual approvals. Lengthy times and/or excessive numbers of requests that required manual approvals may be indicative of an insufficient number of pre-approved solutions, or an indication that existing pre-approved solutions require updating to address changed security requirements. In addition, reports that summarize which approved solutions are finding application in which agile environments will be provided as these are desirable from a governance standpoint. Of course, many other forms of reports can be provided.

The alerting engine 118 affords a means of notifying users, managers, and others of potential bottlenecks, unaddressed risks, and other problems that may arise in connection with service requests. For example, when requested approvals have been outstanding for predetermined periods of time, alerts can be sent to both the requesting entity and the approver as a reminder. Further, lack of use of environments can be flagged and used as means to reduce risk by eliminating unused facilities. Alerts concerning potential malfeasance may also be provided and may be triggered based on frequencies of requests per user, lack of use of a specified environment, frequencies of deletions or lack of deletions of workloads, interactions with systems outside of a user's areas of responsibility/authorization, and, more generally, requests of any non-standard nature. Likewise, denied requests may be cause for an alert. As with the other aspects of AGS 100, alerts (and the stimuli that trigger them) are logged by logging module 114 so as to make later audits and report compilation easier.

The use of questions with multiple choice possible responses (versus, say, free form text responses) makes the recommendation process of the present invention easier to implement. For example, the set of known questions and known possible responses will correspond to a fixed number of permutations of the collective possible responses to the questions. Each of those permutations may be mapped to a recommendation; that is, each arrangement of possible responses to the questioned presented by the security workflow engine may correspond to a predetermined recommendation for a required infrastructure stack for the associated service request. While this may be a very large list of recommendations, it is nevertheless determinable and it can be augmented periodically as the set of questions and respective possible responses is modified over time. Thus, for any service request a recommendation can quickly be determined by using an index corresponding to the permutation of possible responses provided by the requesting entity as a key to a table of recommendations.

Once the recommendation has been thusly determined, it can be compared to a predetermined set of pre-approved implementations. For example, in one embodiment of the invention each recommendation in the list of recommendations may be tagged or otherwise identified as corresponding to a pre-approved solution. In such circumstances no further comparison of the pre-approved solution is needed and the system can proceed in accordance with whether or not a pre-approved solution is implicated, as discussed above. Alternatively, the set of pre-approved solutions may be maintained separately from the set of recommendations, in which case once a recommendation is identified from the list of recommendations, a comparison between the selected recommendation and the list of pre-approved solutions is needed. Such a comparison may be undertaken in a requirement-wise logical AND fashion, where, for each pre-approved solution, if any requirement that is included in the recommendation does not appear in the respective pre-approved solution, that pre-approved solution is disqualified from consideration. If at the end of a comparison of all the pre-approved solutions there are none that satisfy all of the requirements of the recommendation, the system proceeds in accordance with the above-described process of providing the recommendation along with the list of required approvals (and approvers, if available). Otherwise, the one or more pre-approved solutions that satisfy the recommendation are presented.

Figure 5:
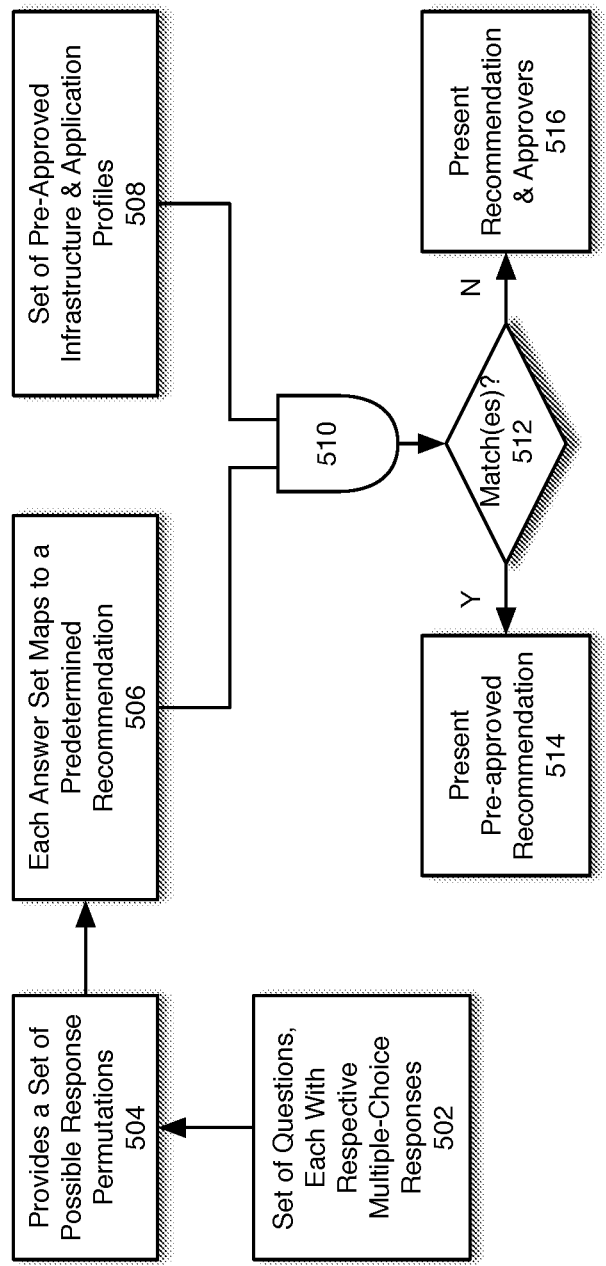
FIG. 5 illustrates an example of how recommended solutions produced in accordance with the present invention may be assessed against pre-approved solutions during the process illustrated in FIG. 3.

FIG. 5 illustrates the above-described process. As indicated at 502, the question and answer dialog between the security workflow engine and the requesting entity makes use of questions with multiple choice possible responses. Consequently, as represented at 504, there exists a set of known possible responses to the questions. Each answer set (and here an answer set is a permutation of the available possible answers to each question) maps, as shown at 506, to a recommendation for an infrastructure stack that will satisfy the associated service request and the security policies implicated by that request.

Thus, as a question and answer session for a given service requests proceeds, the set of possible responses for the request converges to one or more of the predetermined recommendations. Once only a single recommendation is implicated by the service request, or the set of questions has been exhausted, the determined recommendation(s) may be evaluated against the set of pre-approved solutions 508 (which may be specified in instantiation and application profiles stored in repository 112) in a logical AND fashion 510. For example, if the recommendations and pre-approved solutions are specified so as to indicate necessary components of an infrastructure stack in binary fashion (e.g., such that a given stack component is indicated as being required or not), then the recommendation and the pre-approved solutions can be compared in requirement-wise fashion so as to determine whether a pre-approved solution under consideration includes all of the required infrastructure stack components of the recommendation or not 512.

If any of the pre-approved solutions do satisfy the recommendation, then that solution (or those solutions) may be presented as pre-approved recommendations 514. Note that the process of FIG. 5 may be instantiated so that as soon as one pre-approved solution that satisfies the recommendation is identified, the comparison process stops and the identified pre-approved solution is presented as the pre-approved recommendation. Alternatively, the process may be implemented so that all of the pre-approved solutions are always evaluated for each recommendation and all pre-approved solutions that meet the recommendation are presented as possible pre-approved recommendations. While the latter process is more computationally intensive, it affords some flexibility in the ultimate decision regarding adoption of a recommendation and therefore may be preferred in certain instances. Of course, implementations where both alternatives are available can be used. Returning to FIG. 5, if none of the pre-approved solutions satisfy the recommendation, then the recommendation may be presented with the list of required approvals and approvers, as discussed above 516.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Figure 6:
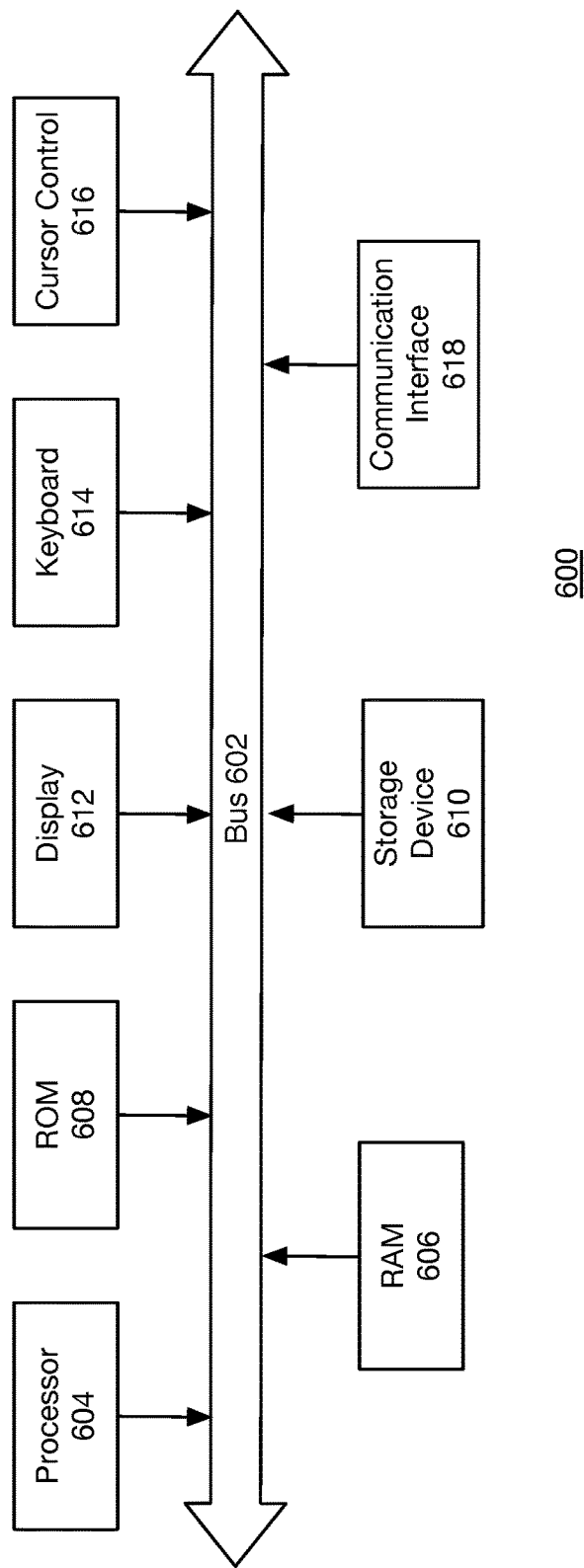
FIG. 6 depicts an exemplary computer system in accordance with some embodiments of the invention.

Further the procedures described herein may involve the use of various computer systems and computer readable storage media having computer-readable instructions stored thereon. FIG. 6 provides an example of a computer system 600 that is representative of any of the computer systems or electronic devices discussed herein. For example, AGS 100 may be instantiated as a computer system 600, in which case the security workflow engine, process and compliance validation and reporting server, alerting engine, and logging module may each be processes running on the computer system. Likewise, repository 112 may be instantiated on the same computer system 600, or it may be a separate computer system communicatively coupled to the computer system (or systems) on which remaining components of AGS 100 are instantiated. Not all of the various computer systems that make up AGS 100 require or necessarily have all of the features of computer system 600. For example, some may not include individual interface components such as a keyboard, display, and/or cursor control device.

Computer system 600 includes one or more busses 602 or other communication mechanism for communicating information, and one or more processors 604 coupled with the bus for processing information. Computer system 600 also includes a main memory 606, such as a random access memory (RAM) or other dynamic storage device, coupled to the bus for storing information and instructions to be executed by the processor. Main memory 606 also may be used for storing temporary variables or other intermediate information during execution of instructions to be executed by processor 604. Computer system 600 further includes a read only memory (ROM) 608 or other static storage device coupled to the bus for storing static information and instructions for the processor 604. A storage device 610, which may be one or more of a hard disk, solid state storage medium, or other storage medium, is provided and coupled to the bus 602 for storing information and instructions (e.g., operating systems, applications programs, and the like).

Computer system 600 may be coupled via the bus 602 to a display 612, such as a liquid crystal or light emitting diode display, for displaying information to a user. An input device 614, such as a keyboard including alphanumeric and other keys, is coupled to the bus 602 for communicating information and command selections to the processor. In some embodiments, the keyboard will be a software construct rendered via a touch screen display 612. Another type of user input device is cursor control device 616, such as a mouse, a trackball, cursor direction keys, and/or any other input device for communicating direction information and command selections to processor 604 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented using a processor 604 executing appropriate sequences of computer-readable instructions contained in main memory 606. Such instructions may be read into main memory from another computer-readable medium, such as storage device 610, and execution of the sequences of instructions contained in the main memory causes the processor to perform the associated actions. The computer-readable instructions may be rendered in any computer language.

In general, the flow diagrams presented and discussed herein are intended to be illustrative of logical steps performed in a sequence to accomplish a given purpose, which is the hallmark of any computer-executable application. Unless specifically stated otherwise, it should be appreciated that throughout the description of the present invention, use of terms such as "processing," "computing," "calculating," "determining," "displaying," "presenting," or the like, refer to the action and processes of an appropriately programmed computer system, such as computer system 600 or similar electronic computing device, that manipulates and transforms data represented as physical (electronic) quantities within its registers and memories into other data similarly represented as physical quantities within its memories or registers or other such information storage, transmission or display devices.

Computer system 600 also includes a communication interface 618 coupled to the bus 602. Communication interface 618 provides a two-way data communication channel with other computer systems (e.g., via one or more computer networks). For example, communication interface 618 may be a local area network (LAN) (wired and/or wireless) interface to provide a data communication connection to a compatible LAN, which itself is communicatively coupled to the Internet through one or more Internet service provider networks. The precise details of such communication paths are not critical to the present invention. What is important is that computer system 600 can send and receive messages and data through the communication interface and in that way communication with other computer systems is facilitated.

The various repositories described herein are computer-based record keeping systems. Stated differently, these repositories may be each a combination of computer hardware and software that act together to allow for the storage and retrieval of information (data). Accordingly, they may resemble computer system 600 (e.g., in the form of databases), or be instantiated as file systems, or other forms of storage.

What is claimed is:

1. A method, comprising:
receiving, at a server, an infrastructure change request issued from a requesting entity, the infrastructure change request concerning an agile information technology environment;
describing and classifying, by the server, the infrastructure change request on the bases of a nature and character of the agile information technology environment, and the requesting entity's specification of a nature and character of data intended to be collected, operated upon, and/or generated by an application running in the agile information technology environment in which the requested infrastructure change will be instantiated;
processing, by the server, the infrastructure change request according to data-centric, risk-based metrics that have associated security policies;
based on the security policies, the server producing and presenting recommendations for instantiations of the requested infrastructure change using, where available, pre-approved solutions for the requested infrastructure change, and when no pre-approved solution for the requested infrastructure change is available, derived recommendations, the server including with the derived recommendations a list of approvals required before the requested infrastructure change can be provisioned, and a list of approvers required to give said approvals; and
upon receipt of the approvals, one or more of the derived recommendations is added to a library of pre-approved solutions for infrastructure change requests.

2. The method of claim 1, further comprising providing a recommended solution for the requested infrastructure change to an automated provisioning system for deployment in the agile information technology environment.

3. The method of claim 1, wherein the requesting entity's specification of the nature and character of data intended to be collected, operated upon, and/or generated by the application running in the agile information technology environment in which the requested infrastructure change will be instantiated is received as responses to multiple choice questions presented via a user interface.

4. The method of claim 3, wherein the multiple choice questions are presented by the server to the requesting entity dynamically such that each successive question is determined according to one or more of:
(i) the requesting entity's prior responses to previous responses;
(ii) a risk profile for the requested infrastructure change;
(iii) an agility profile for the requested infrastructure change;
(iv) deployment policies for components implicated by said infrastructure change;
(v) approved templates for provisioning of said infrastructure change in agile environments available to host said application; and
(vi) a time at which the requested infrastructure change will be provisioned.

5. The method of claim 1, wherein the recommendations provide for use of an existing agile information technology environment but also require an exception to a pre-approved solution for deployment in that environment.

6. The method of claim 5, wherein the recommendations permit use of an existing cloud infrastructure available to the requesting entity, but only if an exception to the pre-approved solution is permitted.

7. The method of claim 1, wherein the recommendations provide for use of an existing agile information technology environment but also require custom provisioning.

8. The method of claim 1, wherein the recommendations require custom development, installation, and provisioning of a solution.

9. A method, comprising:
receiving, at a server, an infrastructure change request issued from a requesting entity, the infrastructure change request concerning an agile information technology environment;
describing and classifying, by the server, the infrastructure change request on the bases of a nature and character of the agile information technology environment, and the requesting entity's specification of a nature and character of data intended to be collected, operated upon, and/or generated by an application running in the agile information technology environment in which the requested infrastructure change will be instantiated;
processing, by the server, the infrastructure change request according to data-centric, risk-based metrics that have associated security policies; and
based on the security policies, the server producing and presenting recommendations for instantiations of the requested infrastructure change using, where available, pre-approved solutions for the requested infrastructure change, and when no pre-approved solution for the requested infrastructure change is available, derived recommendations,
wherein the requesting entity's specification of the nature and character of data intended to be collected, operated upon, and/or generated by the application running in the agile information technology environment in which the requested infrastructure change will be instantiated is received as responses to multiple choice questions presented via a user interface, and
wherein the multiple choice questions are presented by the server to the requesting entity dynamically such that each successive question is determined according to one or more of:
(i) the requesting entity's prior responses to previous responses;
(ii) a risk profile for the requested infrastructure change;
(iii) an agility profile for the requested infrastructure change;
(iv) deployment policies for components implicated by said infrastructure change;
(v) approved templates for provisioning of said infrastructure change in agile environments available to host said application; and
(vi) a time at which the requested infrastructure change will be provisioned.

10. The method of claim 9, further comprising providing a recommended solution for the requested infrastructure change to an automated provisioning system for deployment in the agile information technology environment.

11. The method of claim 9, wherein when no pre-approved solution for the requested infrastructure change is available, the server including with the derived recommendations a list of approvals required before the requested infrastructure change can be provisioned.

12. The method of claim 11, when no pre-approved solution for the requested infrastructure change is available, the server including with the derived recommendations a list of approvers required to give the approvals required before the requested infrastructure change can be provisioned.

13. The method of claim 12, wherein upon receipt of the approvals, one or more of the derived recommendations is added to a library of pre-approved solutions for infrastructure change requests.

14. The method of claim 9, wherein the recommendations provide for use of an existing agile information technology environment but also require an exception to a pre-approved solution for deployment in that environment.

15. The method of claim 14, wherein the recommendations permit use of an existing cloud infrastructure available to the requesting entity, but only if an exception to the pre-approved solution is permitted.

16. The method of claim 9, wherein the recommendations provide for use of an existing agile information technology environment but also require custom provisioning.

17. The method of claim 9, wherein the recommendations require custom development, installation, and provisioning of a solution.

\* \* \* \* \*